United States Patent [19]
Kim et al.

[11] Patent Number: 5,856,921
[45] Date of Patent: *Jan. 5, 1999

[54] APPARATUS AND METHOD FOR INTERMODULAR COMMUNICATIONS USING SYSTEM BUS CONTROLLERS

[75] Inventors: Young Il Kim, Gaithersburg, Md.; Ki B. Kang, Centreville, Va.; Young C. Cheon; Jong Ky Lee, both of Gaithersburg, Md.

[73] Assignee: Samsung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 482,396

[22] Filed: Jun. 7, 1995

[51] Int. Cl.$^6$ .................................................. G05B 15/00
[52] U.S. Cl. ........................... 364/132; 364/188; 395/284; 395/301; 395/800.3; 395/872; 395/873
[58] Field of Search .................................... 364/132, 188; 711/147, 206, 121, 150, 151, 152, 153, 163; 395/200.44, 200.45, 800.3, 800.21, 284, 301, 872, 873; 379/237

[56] References Cited

U.S. PATENT DOCUMENTS

| | | | |
|---|---|---|---|
| 3,800,097 | 3/1974 | Maruscak et al. | 361/791 |
| 4,575,780 | 3/1986 | Brombal et al. | 361/788 |
| 4,658,333 | 4/1987 | Grimes | 361/788 |
| 4,663,748 | 5/1987 | Karbowiak et al. | 370/85.4 |
| 4,985,830 | 1/1991 | Atac et al. | 364/200 |
| 5,006,961 | 4/1991 | Monico | 361/788 |
| 5,083,259 | 1/1992 | Maresh et al. | 395/306 |
| 5,105,420 | 4/1992 | Ardon et al. | 370/16 |
| 5,123,094 | 6/1992 | MacDougall | 395/375 |
| 5,265,237 | 11/1993 | Tobias et al. | 395/500 |
| 5,359,714 | 10/1994 | Avaneas | 395/281 |
| 5,408,469 | 4/1995 | Opher et al. | 370/60.1 |
| 5,408,616 | 4/1995 | Murr | 395/281 |
| 5,497,466 | 3/1996 | Roden et al. | 395/306 |
| 5,530,842 | 6/1996 | Abraham et al. | 395/500 |
| 5,578,940 | 11/1996 | Dillon et al. | 326/30 |

*Primary Examiner*—Reba I. Elmore
*Assistant Examiner*—McDieunel Marc
*Attorney, Agent, or Firm*—Jones & Volentine, L.L.P.

[57] ABSTRACT

A system bus architecture for intermodular communications is disclosed. The system bus architecture comprises a backplane bus with associated memory and a plurality of control registers. A master system processor module is coupled to the backplane bus via a master bus controller. The master system processor module contains a central processing unit in selective communication the master bus controller. A plurality of slave modules are also coupled to the backplane bus via respective slave bus controllers. Each of the slave modules has a slave central processing unit in selective communication the slave bus controller. The master and slave bus controllers are in selective communication with the bus memory, the plurality of control registers, and the respective central processing units, to transmit and receive data through the backplane bus.

11 Claims, 7 Drawing Sheets

| ADDRESS | 15............2 1 0 | Description |
|---|---|---|
| 8010 0000H | Rx buffer | Block #1 : Rx data buffer |
| 8010 08FFH | Tx buffer | Block #2 : Tx data buffer |

| ADDRESS | 15............2 1 0 |
|---|---|
| 8000 0000H | Interrupt Mask |
| 8000 0004H | RQST |
| 8000 0008H | DONE |
| 8000 000CH | ACK |
| 8000 000DH | (RESERVED) |
| : | " |
| : | " |
| 8010 0000H | SSB DATA Space (4KWord) |
| | |
| 8010 0FFFH | |
| 8010 1000H | (RESERVED) |
| : | " |
| 8FFF FFFFH | " |

Interrupt Mask Register address : 8000 0000H (Write only)

| B15 | B14 | B13 | B12 | B11 | B10 | B9 | B8 | B7 | B6 | B5 | B4 | B3 | B2 | B1 | B0 |
|-----|-----|-----|-----|-----|-----|----|----|----|----|----|----|----|----|----|-----|
| -   | -   | -   | -   | -   | -   | -  | -  | -  | -  | -  | -  | -  | -  | -  | 0/1 |

1) B15–B1 : 0 (Not Used Value)
2) B0 : 0 = SSB Interrupt to local CPU is enabled
   1 = SSB Interrupt to local CPU is disenabled

FIG.5A

RQST Register address : 8000 0004H (Write Only)

| B15 | B14 | B13 | B12 | B11 | B10 | B9 | B8 | B7 | B6 | B5 | B4 | B3 | B2 | B1 | B0 |
|-----|-----|-----|-----|-----|-----|----|----|----|----|----|----|----|----|----|-----|
| -   | -   | -   | -   | -   | -   | -  | -  | -  | -  | -  | -  | -  | -  | -  | 0/1 |

1) B15–B1 : 0 (Not Used Value)
2) B0 : 0 = Normal Operation
   1 = Requst for SSB Using DONE Register address : 8000 0008H (Write Only)

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| - | - | - | - | - | - | - | - | - | - | - | - | - | - | - | 0/1 |

1) B15~B1 : 0 (Not Used Value)
2) B0     : 0 = Normal Operation
             1 = The end of SSB Task access cycle for SSB function (SRAM Access)

FIG.5C

ACK Register address : 8000 000CH (Read Only)

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| - | - | - | - | - | - | - | - | 0/1 | 0/1 | - | - | - | - | - | - |

1) B15–B8, B5–B0 : 0 (Not Used Value)
2) B7              : 0 = Normal Operation
                 1 = SSB Task can use SSB Function, SRAM for SSB
3) B6              : 0 = No Error during reception from SPU
                 1 = Parity Error on received Data from SPU

FIG.5B

APPARATUS AND METHOD FOR INTERMODULAR COMMUNICATIONS USING SYSTEM BUS CONTROLLERS

BACKGROUND OF THE INVENTION

1. Field of the Invention

The present invention generally relates to system bus controllers and, more particularly, to a method and apparatus for intercommunication between system processor units (SPU), and between a SPU and all other system modules, including interface, clock, and switch units.

2. Description of the Prior Art

A system bus enables the exchange of data, usually in word-size quantities, among the various computer system units. In practice, a large number of units are connected to a single bus, with each unit contending in an orderly way for use of the bus for individual transfers.

The timing and sequence of data exchange between system components is controlled by a particular network bus architecture. One such architecture is known as Ethernet. All stations in a Ethernet are connected, through network interface cards or connectors, to a cable that is run to each user's equipment. The cable may be a unshielded twisted pair (UTP) wire (using an RJ-45 connector) or coaxial cable.

The Ethernet network uses a protocol called carrier-sense multiple access with collision detection (CSMA/CD). In the CSMA/CD protocol, each station shares the cable by constantly monitoring the cable to detect when it is idle (no user transmitting), when one user is transmitting (successfully), or when more than one user is simultaneously trying to transmit (collision).

The cable basically acts as a broadcast bus. Any station may transmit on the cable if the station detects it to be idle. Once a station transmits, other stations will not interrupt the transmission. With collision detection, if two stations begin to transmit at the same time, they detect the collision, stop, and retry after a randomly chosen period of time.

Ethernet networks have rated transmission data speeds of 10 million bits per second (Mbps). Idle time and collisions, however, can reduce the useful information throughput considerably, to approximately 1–2 Mbps. Fiber optic cables can not be used in such networks because they are not suited for direct taps by stations, which is possible with electrical coaxial cable.

In token ring networks, stations are arranged in an circle with point-to-point links between neighbors. Transmission flow is in one direction, either clockwise or counterclockwise. A transmitted message is relayed over the point-to-point links to the receiving station and then forwarded around the rest of the ring and back to the sender to serve as an acknowledgement. Only a station possessing a "token" (a single digital code word) may transmit. After transmitting, the station passes the token to its downstream neighbor, thus there are no collisions in a token ring.

Because token rings use point-to-point links, various transmission media such as shielded twisted pair (STP) and fiber optic cable may be used.

The transmission speed of a token ring depends on the transmission media used, ranging from 1 Mbps with STP to 16 Mbps with fiber optic cable. Most installations use STP, as it is the cheaper of the two.

These existing bus topologies have several disadvantages. For one, the transmission speeds are slow. As discussed above, while Ethernet speeds are rated at 10 Mbps, in actual operation they are much slower due to idle time and collisions. Token ring speeds range from 1–16 Mbps, but the data flow is unidirectional.

A second disadvantage is that large number of connecting pins are required and mechanical connections are required for the above topologies. Both topologies also require complex protocols to set up the messages and manage the data transfer. Finally, complex hardware schemes are required to support data transfer and error checking functions.

In light of the foregoing, there exists a need for system bus controller capable of wide bandwidth bi-directional data transfer, both between and among system processors and system modules, while employing simple protocols and hardware to format and manage data transfer.

SUMMARY OF THE INVENTION

The present invention is directed to a system bus architecture incorporating system bus controllers in each system module, which substantially obviates one or more of the problems due to the limitations and disadvantages of the related art.

In general, the system bus controller allows communications between two different processor modules (i.e., inter-processor communications (IPC)), one being a master, the other a slave. Also, the system bus controller provides for data communication between slave modules, or between a master module and a plurality of slave modules.

Moreover, the system bus controller allows remote data transfer by the master controller through the backplane and provides sufficient bandwidth for IPC on the backplane.

To achieve these and other advantages and in accordance with the purpose of the invention, as embodied and broadly described, the invention provides for a system bus for intermodular communications, comprising:

- a backplane bus;
- a memory means in communication with the backplane bus for storing data;
- a plurality of registers for controlling access to the memory means;
- a master system processor module coupled to the backplane bus via a master bus controller, the master system processor module having a central processing unit in selective communication with the master bus controller;
- a plurality of slave modules coupled to the backplane bus via a slave bus controller, each of the plurality of slave modules having a slave central processing unit in selective communication with said slave bus controller;
- the master and slave bus controllers being in selective communication with the memory means, the plurality of registers, and respective central processing units, to transmit and receive data through the backplane bus.

In another aspect, the invention provides for a method of master-slave module communications comprising the steps of:

- requesting access, by a master central processing unit, to the slave module;
- determining whether the slave module can be accessed;
- receiving acknowledgement that the slave module can be accessed;
- accessing the shared memory to transfer data between the master and slave modules; and indicating, by the master central processing unit, that the data transfer is complete.

In still another aspect, since the backplane bus is bidirectional, the above identified method steps are applicable to the following scenarios:

a master module accessing one or more slaves modules, a slave module accessing a master module, or a slave module accessing a slave module through the master module.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a table illustrating memory map addresses and associated registers;

FIG. 5A–5D are tables illustrating respective request, acknowledge, done and interrupt registers.

DETAILED DESCRIPTION OF A PREFERRED EMBODIMENT OF THE INVENTION

Figure 1:
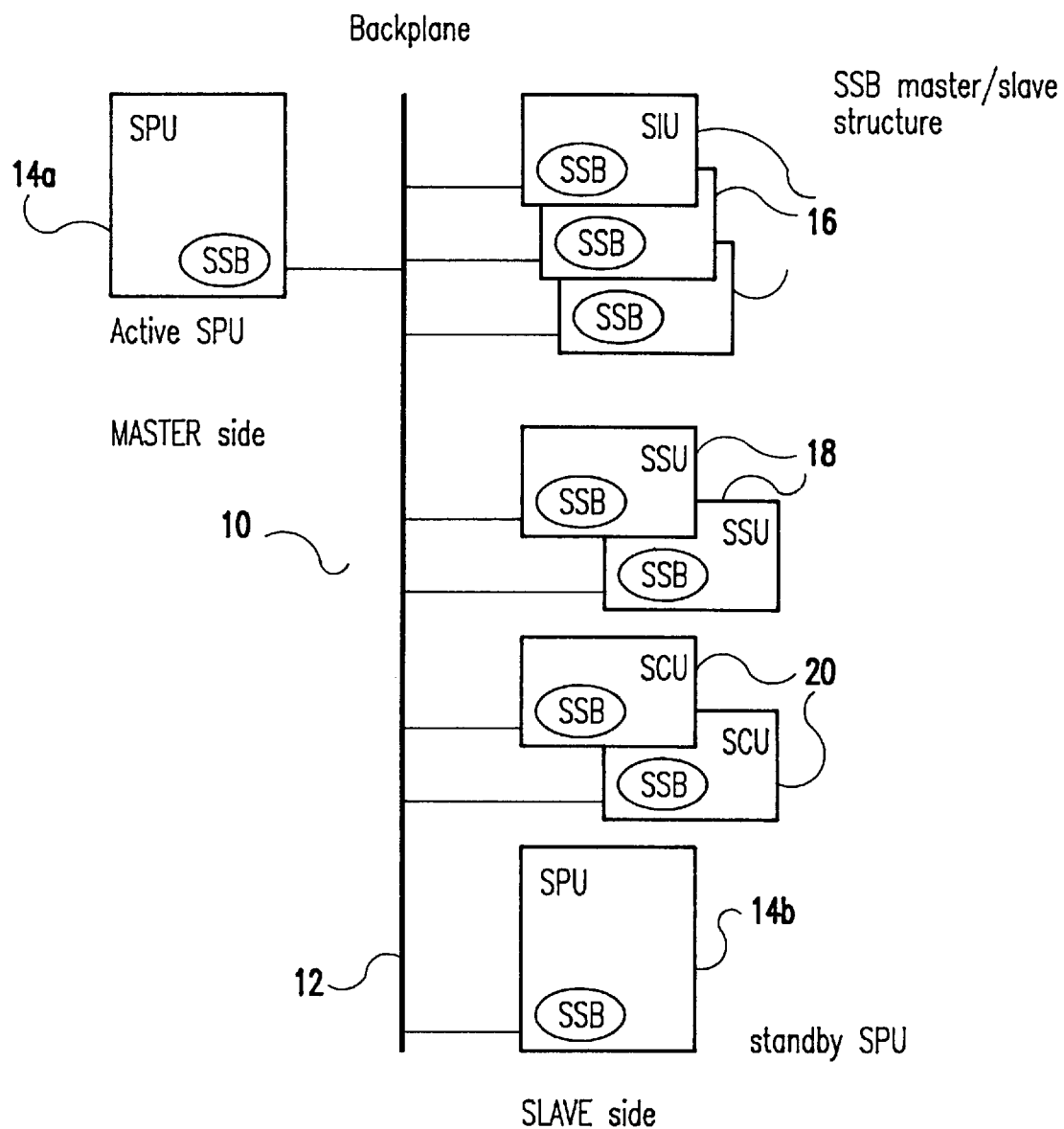
FIG. 1 is a diagrammatical representation of the system bus structure of the present invention.

Referring now to the drawings, and more particularly to FIG. 1, there is shown a general overview of a system bus architecture 10 employing the apparatus and method of the present invention. As shown, the system bus architecture includes a backplane bus 12 in communication with a plurality of, respectively, system processor units (SPU) 14a and 14b, system interface units (SIU) 16, system switch units (SSU) 18, and system clock units (SCU) 20. While there are a plurality of SPUs, SIUs, SSUs, and SCUs shown in FIG. 1, it is understood that depending on the particular system configuration, any number of the respective units may interface with the backplane 12, including single embodiments of the respective units.

Some of the exemplary functions of the various units are as follows. The SPUs contain, for example, the operating system, operations and maintenance (OAM) software, and call control software. The SSUs provide for asynchronous transfer mode (ATM) switching and the SCUs provide network synchronization. Finally, the SIUs provide ATM cell, frame relay, Local Area Network (LAN), and Pleisochronous Digital Hierarchy (PDH) interfaces.

The backplane bus 12 is a sixteen (16) bit wide high speed parallel bus with data transfer capability of up to 10 MBytes/sec. The backplane bus is thus about eight (8) times faster than an Ethernet or Token ring network. Interprocessor communication traffic on this high speed bus will mostly be in burst mode and point-to-point in nature. At times the point-to-point traffic could become stream mode, although it is estimated that the frequency of stream traffic would be very low. Instances of stream mode data transfer would occur between modules during initial download, during accounting data transfer, and during management data transfer between the network management stations. The SPU may be required to do broadcasts at certain times and broadcast data will always be in burst mode. In most cases, burst mode IPC applications will transfer a single message buffer. Currently the maximum size of an internal operating system message buffer within the bus structure is 1024 bytes.

In the embodiment shown, the backplane bus 12 supports communication between an active SPU 14a on the master side, and the various interface 16, switch 18 and clock 20 units on the slave side. The standby SPU 14b also runs in the slave mode. Either one, but only one, of the SPUs may be designated the master (active), and the other must be designated a slave (standby) as there can be only one master processor for the system. As shown in FIG. 1, the communication channels are bidirectional through the backplane.

Figure 2:
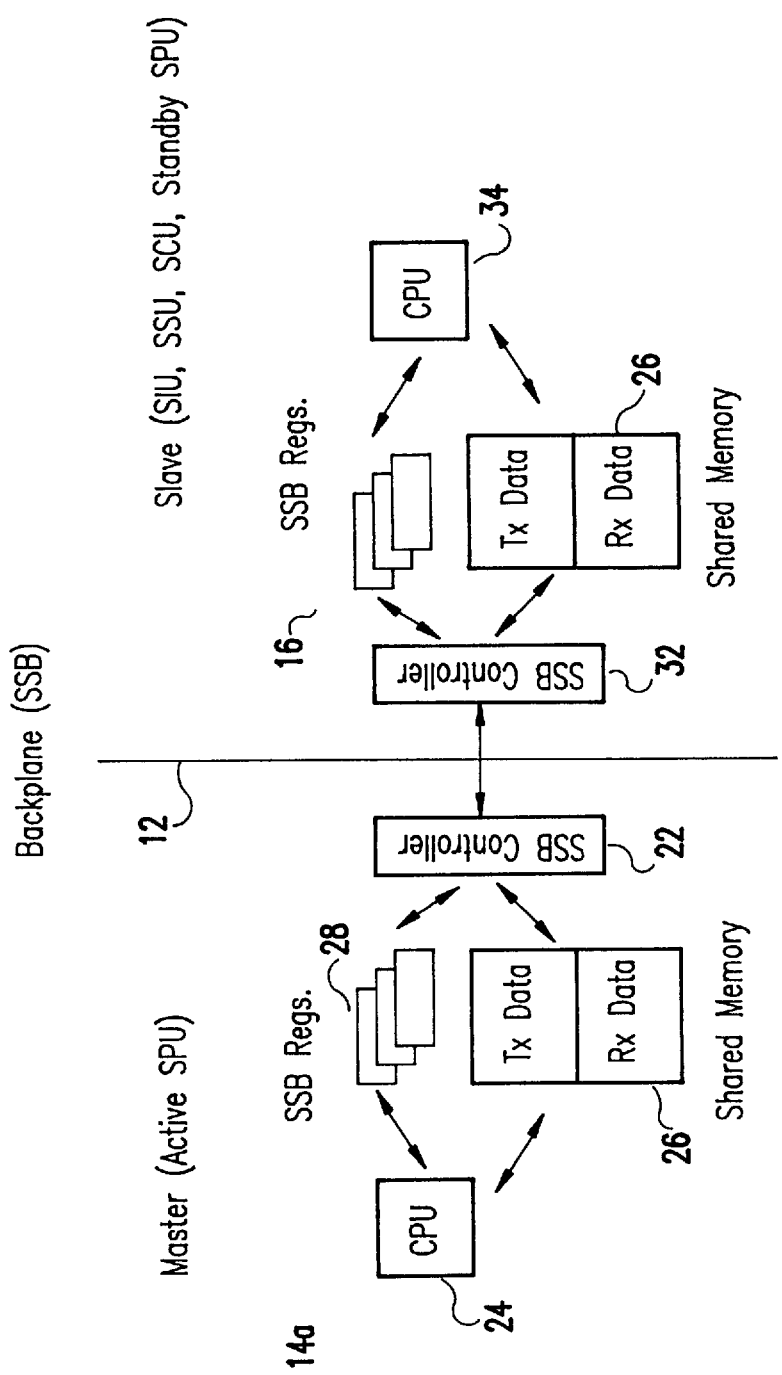
FIG. 2 is a diagrammatical representation of the functional components of the master and slave modules.

The internal configuration and operation of each of the modules is functionally similar. As shown in FIG. 2, the master module (i.e., the active SPU 14a) has an associated bus controller 22 and central processing unit 24. Similarly, the slave module 16 (e.g., an SIU) also has an associated bus controller 32 and central processing unit (CPU) 34. For simplification, only one slave module is shown in FIG. 2. It is understood that each of the interface 16, switch 18, and clock 20 units, and the standby SPU 14b, all contain a bus controller and central processing unit (CPU).

Each of the bus controllers of the master and slave modules interface with a shared bus memory, in particular a static random access memory (SRAM) device 26. The SRAM 26 is divided into two sections, Receive (Rx) and Transmit (Tx), and is used to save the messages generated for each direction of the microprocessor. FIG. 3 illustrates an exemplary memory map of the SRAM and associated control registers (discussed further below). The Tx and Rx areas are able to hold up to 4096 bytes each at any one time. This memory capacity may be increased if necessary.

The communications protocol on the backplane is controlled by the master bus controller 22, which controls the negotiation and direction of data flow through the backplane between the master and slave CPUs and generates the access timing sequences between the SPU and each SIU, SSU, and SCU to provide read and write access to the particular requesting microprocessor.

When there is no traffic to be passed, all of the slave bus controllers 32 (SCUs, SIUs, SSUs, and the standby CPU) show a READY signal through the backplane. The READY signal indicates that the master CPU has approval to access the particular slave module. Conversely, when the READY signal is deactivated, the master CPU can not access the module.

If the slave module is using shared memory, the READY signal is deactivated according to the status of the ACK register, which is described further below.

The master CPU can easily access the shared memory of each of the slave SRAMs. Access to SRAM 26 is carried out through a series of control registers that communicate with the bus controller using the following internal protocol commands:

>RQST : Request access for SRAM
>ACK : Wait the acknowledge from bus controller
>INTERRUPT: Accept and access the bus device
>DONE : Indication of end of access An exemplary write/read sequence will now be described with reference to FIG. 4 and the register tables of FIGS. 5A–5D. The particular register bits illustrated in the register tables are for discussion purposes. It is understood that alternate register structures may be utilized in the practice of this invention. In this sequence described below, the master SPU will first write data to the shared memory (SRAM) of an SIU and then the SIU will read the written data.

The bus architecture of the present invention may used with the Software Driver for a System Bus, disclosed in U.S. patent application, Ser. No. 08/474,174, (Attorney Docket No. SNL-PAT95001) filed Jun. 7, 1995 by Gananathan Suresh et al., the entire disclosure of which is incorporated herein by reference. Portions of the specification of the Jun. 7, 1995 patent application are reproduced in appropriate sections below for ease of reference and discussion.

Figure 4:
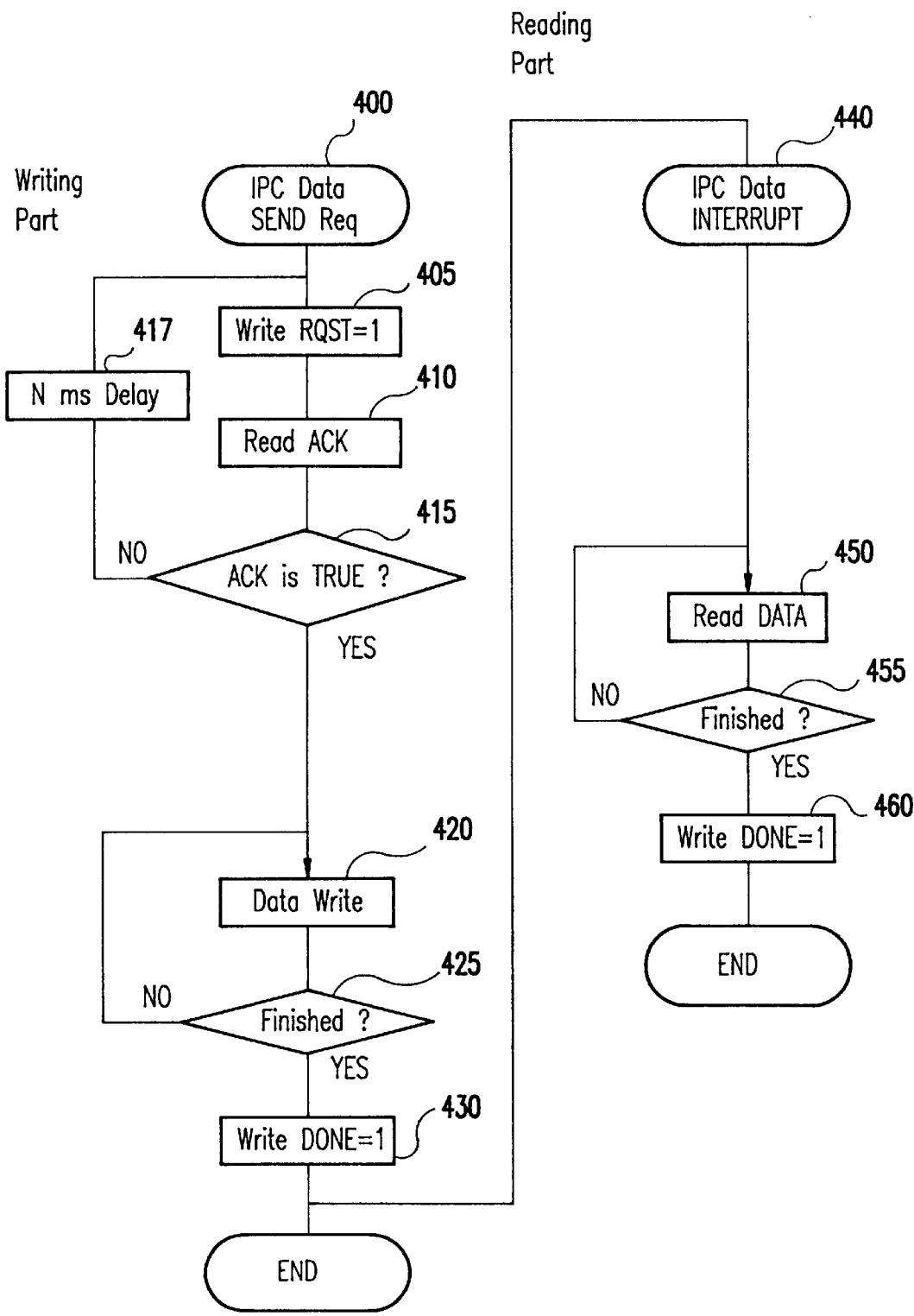
FIG. 4 is a flow diagram of the read and write cycles in accordance with the present invention.

When the master CPU 24 wants to access the bus 12, it sends a request signal to its bus controller 22 by writing "1" on the RQST register associated with the bus 12 (step 405 in FIG. 4). Shown in FIG. 5A is the 16-bit RQST register, with B0 being the only bit used. In this case, B0 would be "1" signifying a bus request, otherwise B0 would be set to "0".

The bus controller 22 queries the bus 12 to determine whether the bus is being used. If the bus is "in use", a bus READY signal will be set low ("0"). If the bus is free, the bus READY signal will be set high ("1").

Corresponding to the bus READY signal level, B7 of the ACK register (FIG. 5B) would be set to "1" to indicate that bus 12 may be used, or set to "0" to indicate that the bus is busy. B0–B5 and B8–B15 are not used.

In step 410 of FIG. 4, the CPU 24 reads the ACK register to determine whether the SPU can use the bus. In decision block 415, if ACK is "0", step 405 is repeated after an "N" millisecond (ms) delay (step 417). Since it takes about or below 1 ms to send a 1Kbyte message to the slave side, it would take an equal amount of time to receive acknowledgement from the controller. Accordingly, "N" would be about or above 1 ms. If ACK is a "1", the data may be written to the SRAM 26 (step 420).

After all the data is written to the SRAM (step 425), the CPU 24 sets B0 of the DONE register in FIG. 5C to "1" to indicate to the bus controller 22 that the write cycle is complete (step 430 of FIG. 4). During the write cycle B0 would be set to "0". B1–B15 are not used in this embodiment.

The read sequence by the SIU will now be described. At the end of the write access by the SPU 14a, the bus controller generates an INTERRUPT signal (step 440 of FIG. 4) that is received by the local CPU 34 of the SIU to indicate the arrival of data from the SPU. As shown in FIG. 5D, B0 of the INTERRUPT register would be set to "0" to enable the signal, and would be set to "1" to disenable the signal.

In step 450 of FIG. 4, the data is read from the SRAM 26 by the SIU. After the data is read, the local CPU 34 of the SIU sets B0 of the DONE register in FIG. 5C to "1" to indicate to the bus controller 32 that the read cycle is complete (step 460 of FIG. 4).

It is to be understood that the above sequence is exemplary only and that many combinations of read and write cycles between the master and various slave modules may be implemented in the practice of this invention. For example, as shown in FIG. 1, it is possible to send and receive messages through the backplane bus 12 between the active SPU and the slave SPU, as well as between the master SPU and any of the SIUs, SSUs, and SCUs.

Also, as depicted in FIG. 1, there are no direct intercommunication connections within or among any of the slave module groups themselves. For example, if any transmitting SIU needed to send a message to another receiving SIU, the message is first transferred by the transmitting SIU via the backplane bus 12 to the master SPU, which then transmits the message to receiving SIU. The same occurs between, as well as among the various other slave modules. If any transmitting SIU needed to send a message to a receiving SSU, the message is first transferred by the transmitting SIU via the backplane bus 12 to the master SPU, which then transmits the message to receiving SSU.

RQST signals by any local CPU are asynchronous in that they are directed to the associated bus controller only when a data packet is ready to be transferred to the bus shared memory 26 and the shared memory 26 will be immediately released once the transfer is over.

Figure 6:
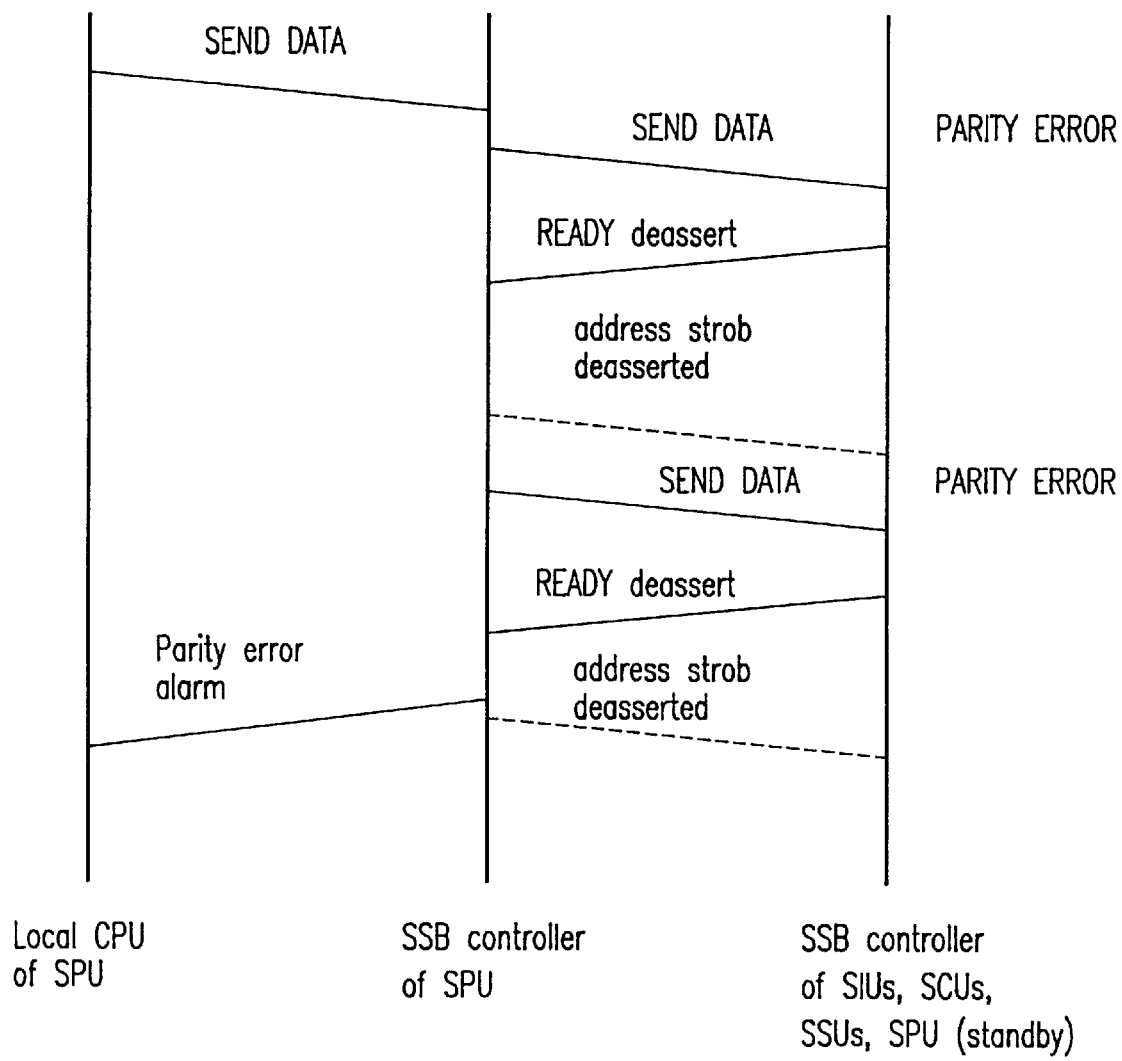
FIG. 6 illustrates the parity-error detection method of the present invention.

FIG. 6 illustrates the parity-error detection method of the present invention. On a 16-bit bus, there is single bit parity detection for each 8-bits. In a one-bit parity code the number of binary "ones" (1s) in a data word are counted. The word has odd parity if the number of 1s is odd and even parity otherwise. When a word is written into memory, the parity bit is also written. The parity bit is read and checked when the word is read out. If the stored and checked parity bits do not match, an error is detected. A one-bit parity code can detect at most one bit of error in the data item.

As shown in FIG. 6, the local CPU of the active SPU sends data to the bus controller of the active SPU. The data is then sent to the slave bus controller designated to receive the message. The slave then checks the system bus I/O ACK register (FIG. 5B) for the B6 bit being set to "1" indicating a parity error on the received data from the SPU. If B6 were "0", it would indicate no error.

If a parity error is detected, the slave bus controller attempts to terminate the communication path. However, since the signal is still active (i.e., the Address strobe is still active even though the READY signal was deactivated when the bus 12 was accessed by the SPU), the bus controller of the active SPU will try to resend the message to the slave bus controller (here the Address strobe is now deasserted) on the same channel.

If there are any transmission errors, the driver will drop the packet and inform the network management system (NMS). Upper level IPC protocol (Transmission control protocol—TCP) will detect the lost packet and recover from these errors. Therefore, all applications using the system bus for IPC will have to use the services provided by the system IPC to guarantee reliable transmission.

While the invention has been described in terms of the embodiments described above, those skilled in the art will recognize that the invention can be practiced with modification within the spirit and scope of the appended claims.

Having thus described my invention, what we claim as new and desire to secure by letters patent is as follows:

1. A system bus architecture for intermodular communications, comprising:

a backplane bus;

a master system processor module coupled to said backplane bus via a master bus controller, said master system processor module having a central processing unit in selective communication with said master bus controller;

a plurality of slave modules each coupled to said backplane bus via a slave bus controller, each of said plurality of slave modules having a slave central processing unit in selective communication with said slave bus controller;

a shared bus memory in communication with said backplane bus for storing data communicated from said master system processor module to said plurality of slave modules; and a plurality of registers for permitting access to said shared bus memory by said master system processor module when said shared bus memory is not being accessed by one of said slave modules and denying access to said shared memory by said master system processor module when said shared bus memory is being accessed by one of said slave modules, said master and slave bus controllers being in selective communication with said shared bus memory, said plurality of registers, and respective central processing units, to communicate data through said shared bus memory and said backplane bus.

2. A system bus as in claim 1, wherein said master system processor module is an active system processor unit.

3. A system bus as in claim 1, wherein said slave module is a standby system processor unit.

4. A system bus as in claim 1, wherein said slave module is selected from the group consisting of a system interface unit, a system switch unit, and a system clock unit.

5. A system bus as in claim 1, wherein said shared bus memory is shared static random access memory (SRAM).

6. A system bus as in claim 1, wherein said plurality of registers comprise request, acknowledge, interrupt, and done registers.

7. In a system bus architecture having a backplane bus with a shared memory unit controlled by a plurality of registers, a master module, having a master bus controller and a master central processing unit, and at least one slave module, having a slave bus controller and a slave central processing unit, a method of master-slave module communications, comprising:

requesting access, by said master central processing unit, to the bus;

determining, by said master central processing unit, whether the bus can be accessed;

receiving acknowledgment, by said master central processing unit, that the bus can be accessed;

accessing the shared memory, by said master central processing unit, to transfer data between said master and slave modules;

indicating to the master bus controller, by the master central processing unit, that said data transfer is complete;

indicating to the slave module, by said master bus controller, that said transferred data is in the shared memory;

accessing the shared memory, by said slave central processing unit, to read said transferred data; and indicating to the slave bus controller, by said slave central processing unit, that said data read is complete.

8. A method as in claim 7, wherein the requesting access is performed by communicating with a first register.

9. A method as in claim 8, wherein the acknowledgement is performed by the master bus controller by communicating with a second register.

10. A method as in claim 9, wherein indicating to the slave module that transferred data is in the shared memory is performed by communicating with a third register.

11. In a system bus architecture having a backplane bus with a shared memory unit controlled by a plurality of registers, a master module, having a master bus controller and a master central processing unit, and at least one slave module, having a slave bus controller and a slave central processing unit, a method of slave-master module communications comprising:

requesting access, by said slave central processing unit, to the bus;

determining, by said slave central processing unit, whether the bus can be accessed;

receiving acknowledgment, by said slave central processing unit, that the bus can be accessed;

accessing the shared memory, by said slave central processing unit, to transfer data between said slave and master modules;

indicating to the slave bus controller, by the slave central processing unit, that said data transfer is complete;

indicating to the master module, by said slave bus controller, that said transferred data is in said shared memory;

accessing the shared memory, by said master central processing unit, to read said transferred data; and indicating to the master bus controller, by said master central processing unit, that said data read is complete.

* * * * *